Patented Jan. 5, 1937

2,067,047

UNITED STATES PATENT OFFICE 2,067,047

INSECT AND FUNGI TOXIC FIBROUS MATERIAL

George H. Ellis, St. Paul, Minn., assignor to The Insulite Company, Minneapolis, Minn., a corporation of Minnesota No Drawing. Application June 29, 1935, Serial No. 29,172

4 Claims. (Cl. 92—21)

This invention relates to an insect and fungi toxic fibrous material, and the method of making the same.

An object of the invention is the insect and fungi proofing of wood and/or woody material with a toxic agent that does not liberate poisonous gas which is harmful to human beings.

Another object of the invention is the production of a fibrous material that will not be attacked by insects and fungi, and which will not liberate poisonous gas.

A further object of the invention is the making a fibrous product that has no objectionable odor and/or color, in a relatively inexpensive manner, whereby the fibrous product will have a superior biological resistance.

A further object of the invention is the production of a rot proof, insect repellent and water resisting fibrous product by a single treatment.

Termites and other insects cause damage throughout many portions of the world by attacking and destroying wood and/or woody materials used in construction. In fact, these insects will attack and destroy substantially any woody materials, and included in the materials attacked are wall boards, insulating boards, building boards and the like made from fibers derived from a vegetable source.

In the past many attempts have been made to produce a fibrous product that is insect, fungi and water proof, but so far as is known, there has been no treatment developed that provides all the desired properties by a toxic agent that is non-poisonous to human beings.

The common practice is to treat lumber and fibrous products with arsenic, arsenic compounds, cyanide, mercuric chloride and other similar materials. It is well known that under certain conditions poisonous gas is liberated from materials so treated, and the gas liberated is highly dangerous to occupants of buildings in which the treated material is used.

This invention comprehends the use of a material having toxic properties that is non-poisonous to human beings, that will not liberate poisonous gas, and that does not have any objectionable odors and/or color. One material that answers these severe requirements is a coal tar creosote that has been treated to remove offensive odor and objectionable color material. The coal tar product so treated retains its toxic properties, and is usually in the form of a dry, gray material. A material of this kind is "Riley Preservative #60", which has proven in use to be very effective. Chemical analysis of the material discloses that "Riley preservative" contains hydrocarbons of the general formula $C_{14}H_{10}$, creosote and its homologues, and pyridin like substances which are responsible for the toxicity of the material. The analysis also discloses that the pyridin like substances are present in an amount less than .5%. This low pyridin content is the reason for the non-objectionable odor. It is to be understood, however, that any material that is toxic and at the same time, non-poisonous to human beings, that does not liberate poisonous gas, or the material treated therewith does not liberate a poisonous gas, and that does not have any objectionable odor and/or color, may be utilized.

A toxic containing material having the properties just described is treated to form a special treating material, which for the purpose of this application may be termed an emulsion or solution. Under the treatment hereinafter to be described in the preparation of the toxic agent, there occurs an action which is probably a combination of chemical and physical phenomenon. The resulting product, whatever action occurs, is an important feature of this invention. For the purpose of this application it has been elected to set forth certain methods of applying the toxic material to wood and woody substances, and certain products produced thereby, but it is to be understood that they are here set forth for illustrative purposes only, and are not to be accorded any interpretation such as might have the effect of limiting what is claimed as the invention short of its true and comprehensive scope in the art.

Many additional purposes and advantages of the invention will become apparent with reference to the sub-joined specification.

In the general practice of manufacturing of fibrous products, such as wall board, building board and insulating board, the fibers are suspended in water in the proportion of 1½ parts of fiber to 98½ parts of water. The percentages may be varied in the range of 4 parts of fiber to 96 parts of water. The toxic agent prepared as hereinafter described is well adapted to be used in fungi, insect and water proofing manufactured fibrous products. It is contemplated to treat various products during or prior to formation into eventual production, whereby the treatment is equally effective throughout the entire body. It is also contemplated that the treatment may be applied to any product subject to attack by insects.

Specifically, by way of example, the toxic agent may be prepared by one of the following methods:

A 1. 400 parts toxic containing material having the characteristics previously described.
2. 20 parts of caustic material.
3. 800 parts of water.

These materials are placed in a grinding mill, such as a pebble mill, and ground until a cream-like solution is obtained. The preparation is then removed from the mill and while being agitated, there is added 320 parts of wood or gum rosin soap, which has been diluted with 6,060 parts of water. This produces a 5% solution based on the combined weight of the toxic containing material, the caustic and the rosin soap. The solution or emulsion may be of any desired strength, and this is obtained by controlling the amount of water added.

B 1. 1400 parts of toxic containing material having the characteristics previously described.
2. 800 parts of water.

These materials are placed in a grinding mill and subjected to treatment until a milk-like solution is obtained.

C 1. 400 grams of toxic containing material.
2. 100 grams of sizing material.
3. 20 grams of caustic material.
4. 1400 grams of water.

These materials are placed in a mill and ground for a sufficient length of time to obtain a cream-like solution.

D 1. 26 parts of toxic containing material.
2. 20 parts of sizing material.
3. 10 parts of caustic (such as flake caustic).
4. 160 parts of water.

These materials are placed in a suitable container and cooked for a period ranging from 15 to 60 minutes, preferably about 45 minutes. It is preferred that the materials be steam cooked and thoroughly agitated during the cooking period. After the material has been cooked for a sufficient length of time, water is added to obtain the desired solution. Generally, when using a solution prepared in accordance with this method, it is preferred that a 10% solution be utilized. The toxic materials prepared by the above examples are extremely stable and may be stored and used as required.

Wood or gum rosin is generally used because of the highly satisfactory results obtained, and because the cost of rosin is very reasonable. Any suitable sizing material may be used, and good results have been obtained by the use of resin, stearates, Montan wax and other saponifiable materials. Under many conditions it has been found desirable to use a size emulsion, such as rosin size.

Any suitable caustic material may be used, and the amount used may vary over a considerable range. The best result so far obtained is by using caustic within a range of 5 to 20 parts. Caustic soda has proven extremely satisfactory to use, and the cost thereof is extremely low. The proportions of the materials set forth in the examples may be varied over a considerable range, but those set forth have been found to give the most satisfactory results which have so far been obtained.

It has been discovered that a toxic containing material of the kind described, when subject to treatment in the presence of water, releases some of its toxic material. It has also been discovered that the treating of a toxic containing material of the kind described (particularly a coal tar creosote), in the presence of water and a caustic material, larger amounts of toxic materials are liberated and are taken up by the caustic water solution. It has also been discovered that the toxic material so liberated readily combines with a sizing material (such as rosin soap), which material retains the toxic material so taken up.

The toxic agent or emulsion of Example A may be added to the pulp and thoroughly mixed therewith. It may then be precipitated with alum or the like. The emulsion of Example A may also be used by taking the emulsion as it is discharged from the pebble mill and thoroughly mixing it with the vegetable fiber pulp, and then adding to the pulp sufficient sizing material (such as rosin soap), and thereafter precipitating the emulsion in the usual way.

The emulsion of Example B may be added to the pulp and thoroughly mixed therewith, and then a sufficient amount of rosin size or other sizing material is added and precipitated with alum in the usual way.

The emulsions of Examples C and D may be mixed with the fibrous pulp while in a water bath, and when so added a thorough dissemination of the fibers is produced. If so desired, the emulsions may be precipitated with alum or the like.

To use emulsions in the treatment of fibrous products, it has been determined by many tests that by adding 2½ pounds of the toxic containing material to each 100 pounds of oven dry pulp, the finished product is insect, rot and water proof and/or repellent. To accomplish this there is added 92½ pounds of emulsion (5% solution) to each 100 pounds of oven dry pulp.

It has been discovered that by using a toxic agent prepared in the manner above described, or their equivalents, that the loss in the waste water is reduced to a minimum, and likewise the loss which normally occurs in drying the product is reduced to a minimum, if not entirely eliminated.

By using a toxic agent of the kind described, very little loss of such agent during the manufacturing steps or after the final product has been produced occurs.

By using a toxic agent of the kind described the danger to workmen treating word or woody material from being poisoned is eliminated, and also the pollution of streams into which the water used in making fibrous products is discharged, is likewise eliminated. The precipitating of emulsion results in the emulsion spreading evenly over the fibers, and thus prevents the toxic material from being wasted, or loss in the waste water from the fibrous pulp.

It is desirable, but not always essential, that after the emulsion (especially prepared toxic agent) has been thoroughly mixed with the fibrous material, that there be added some material to precipitate the emulsion. The precipitant may be any suitable material, such as alum, ferric chloride, or the like. To obtain the best results the pH of a stock should fall within a range of 3.5 to 6. Thus far the best results have been obtained by using a pH of approximately 5.

Broadly, the invention comprehends the production of a fibrous product that is treated with a toxic material that is non-poisonous to human beings, and a process of making such fibrous product whereby the product does not liberate a gas that is poisonous to human beings and does not have any objectionable odor and/or color.

It will be obvious to those skilled in the art that many variations in steps and combinations of steps constituting the process and the product produced may be made, which fall within the scope of the invention and without departing from the spirit thereof.

As previously pointed out, the sizing material takes up or combines with the toxic material or materials released by the treating of the toxic containing material. The sizing material retains the toxic agent taken up and results in the obtaining of a thorough toxic agent in which, substantially all, if not all, is active as a toxic agent. Whatever action occurs in making the sizing material toxic, it is to be understood that the making of the sizing material toxic is an important feature of the invention.

Cognate subject matter not claimed herein is embraced in my applications Ser. No. 709,904, filed February 5, 1934 now Patent 2,027,581 of Jan. 14, 1936 and Ser. No. 742,330, filed August 31, 1934.

The treatment of a toxic containing material of the kind described in the presence of water releases some of the toxic material. A greater amount of toxic material is released if the toxic containing material is subject to treatment in the presence of an alkaline material. Any suitable alkaline substance may be used that releases toxic material or materials from the toxic material treated. The use of soda ash, caustic soda, flake caustic or their equivalents have given good results.

In the broadest embodiment the invention comprehends mixing rosin and a toxic material and reducing the mixture to a finely divided state, thereafter incorporating the reduced material in a fibrous product during the process of manufacture.

What I claim is:

1. A fibrous mass having incorporated therein an insecticide and fungicide comprising a toxic agent containing hydrocarbons of the general formula $C_{14}H_{10}$, creosote and its homologues, and pyridin-like substances in amount less than 0.5%.

2. A vegetable fiber product comprising a shaped body formed from fibers in a water bath having incorporated therein rosin and a toxic agent containing hydrocarbons of the general formula $C_{14}H_{10}$, creosote and its homologues, and pyridin-like substances in amount less than 0.5%.

3. A new article of manufacture, a felted body of vegetable fibers devoid of objectionable odor having distributed throughout a sizing material and a toxic agent containing hydrocarbons of the general formula $C_{14}H_{10}$, creosote and its homologues, and pyridin-like substance in amount less than 0.5%.

4. A vegetable fiber product sized and rendered toxic by commingling with fibers in a water bath a solution resulting from interaction of a toxic agent containing hydrocarbons of the general formula $C_{14}H_{10}$, creosote and its homologues, and pyridin-like substances in amount less than 0.5%; a caustic material; and a sizing material.

GEORGE H. ELLIS.